United States Patent
Lee et al.

(10) Patent No.: US 8,988,278 B2
(45) Date of Patent: Mar. 24, 2015

(54) DIGITAL BEAM FORMING USING PHASED ARRAY ARCHITECTURE

(75) Inventors: Jae Seung Lee, Ann Arbor, MI (US); Paul Donald Schmalenberg, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 288 days.

(21) Appl. No.: 13/555,814

(22) Filed: Jul. 23, 2012

(65) Prior Publication Data
US 2014/0022116 A1   Jan. 23, 2014

(51) Int. Cl.
| | | |
|---|---|---|
| G01S 13/00 | (2006.01) | |
| H01Q 3/00 | (2006.01) | |
| G01S 3/74 | (2006.01) | |
| G01S 13/93 | (2006.01) | |
| H01Q 1/32 | (2006.01) | |
| H01Q 3/30 | (2006.01) | |
| G01S 13/02 | (2006.01) | |

(52) U.S. Cl.
CPC ............... G01S 13/931 (2013.01); G01S 3/74 (2013.01); *G01S 2013/0254* (2013.01); *G01S 2013/9321* (2013.01); H01Q 1/3233 (2013.01); H01Q 3/30 (2013.01)
USPC .............................. 342/81; 342/70; 342/372

(58) Field of Classification Search
USPC .......................................................... 342/81
See application file for complete search history.

(56) References Cited

U.S. PATENT DOCUMENTS

| | | | |
|---|---|---|---|
| 6,377,213 B1 * | 4/2002 | Odachi et al. ................. | 342/383 |
| 6,859,168 B2 * | 2/2005 | Isaji .............................. | 342/128 |
| 7,474,262 B2 | 1/2009 | Alland | |
| 7,639,171 B2 | 12/2009 | Alland et al. | |
| 8,258,997 B2 * | 9/2012 | Kemkemian et al. ........... | 342/29 |
| 2005/0012655 A1 * | 1/2005 | Lalezari et al. ................. | 342/62 |
| 2005/0156780 A1 * | 7/2005 | Bonthron et al. ............. | 342/107 |
| 2011/0063158 A1 * | 3/2011 | Kondou .......................... | 342/27 |
| 2011/0187581 A1 * | 8/2011 | Kemkemian et al. ........... | 342/29 |
| 2013/0163705 A1 * | 6/2013 | Stirland ........................ | 375/346 |

FOREIGN PATENT DOCUMENTS

JP    2008180541 A    8/2008

* cited by examiner

*Primary Examiner* — Matthew M Barker
(74) *Attorney, Agent, or Firm* — Gifford, Krass, Sprinkle, Anderson & Citkowski, P.C.

(57) ABSTRACT

A radar apparatus includes a receiver having a plurality of receiver channels, each including an antenna element, a phase shifter, and a switch. The antenna element provides a signal that passes through a phase shifter to a switch. The signal may then be passed to a summing element if the switch is closed. The summing element receives signals from the receive channels, and provides a sum signal to a mixer. In phased array mode, the switches are closed and antenna controller adjusts the phase angles of the phase shifters. In DBF mode, the phase shifters are maintained at a set value, and switches are operated sequentially to provide time-multiplexed signals from the receive channels to the summing element.

8 Claims, 4 Drawing Sheets

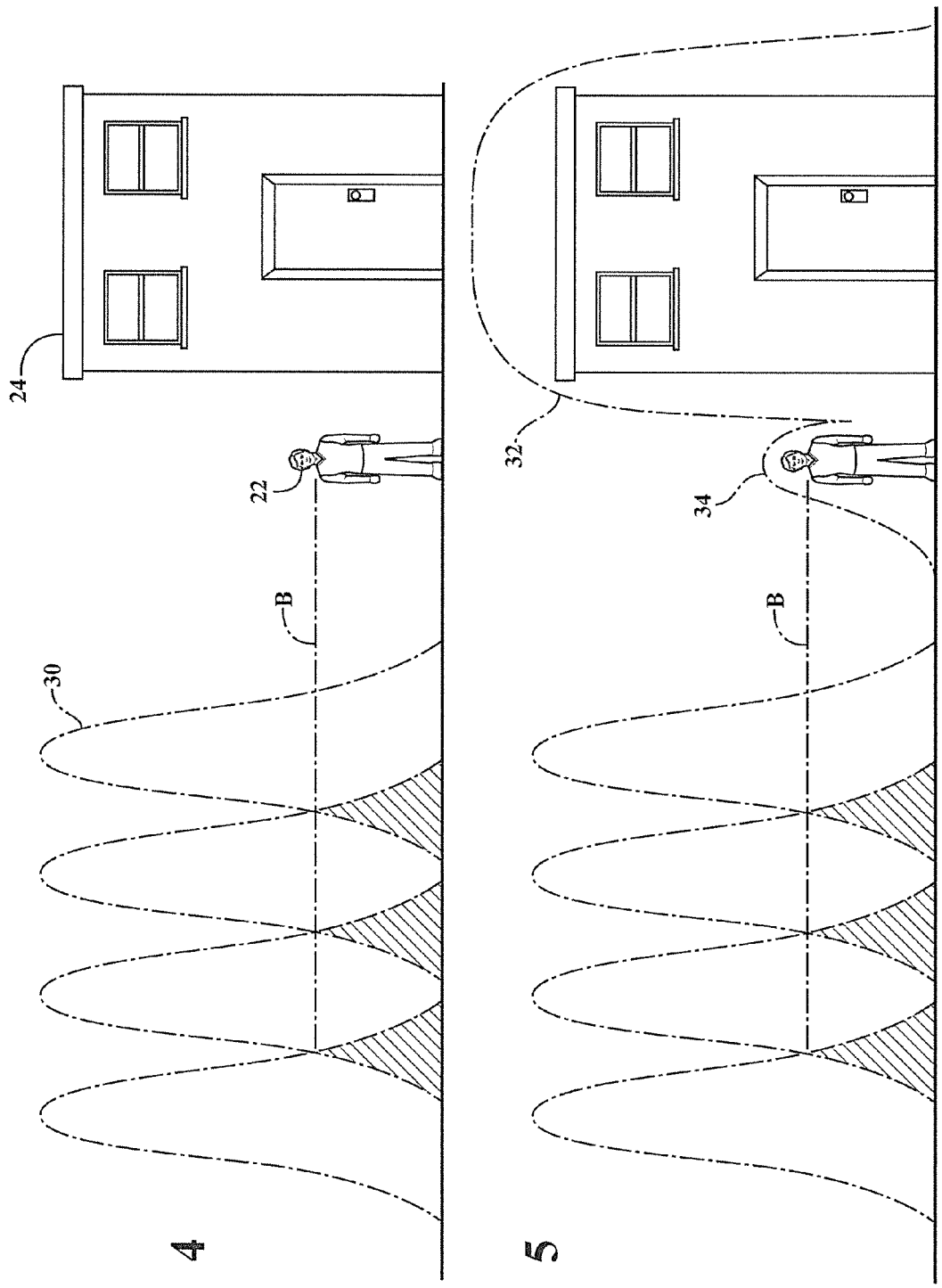

DIGITAL BEAM FORMING USING PHASED ARRAY ARCHITECTURE

FIELD OF THE INVENTION

The invention relates to radar apparatus.

BACKGROUND OF THE INVENTION

Phased array antennas are used to create scanned radar beams. A narrow, real radar beam can be formed and scanned across a field of view. However, in many applications, a phased array antenna is considered expensive.

Digital beam forming (DBF) radar is an alternative approach, using computational methods to synthesize a virtual beam from signals received.

SUMMARY OF THE INVENTION

Examples of the present invention include a phased array radar architecture configured to also function as a DBF (digital beam forming) radar.

An example radar receiver includes receiver antenna elements, each antenna element being electrically connected through a phase shifter and an electronic switch to a summing element. If all switches are closed, the receiver can operate as a phased array receiver using appropriate adjustment of the phase shifters, for example through voltage control signals. If all phase shifters are set to the same value (for example, a zero angle phase shift), multiplexing of the switches allows DBF operation. A waveform from each antenna element is accumulated by selectively closing each of the switches. Time multiplexing allows receive waveforms to be collected for each antenna channel. The collected data is stored in memory, and can be analyzed using super-resolution algorithms.

An example radar apparatus includes a receiver having a plurality of receive channels, each receive channel including an antenna element, a phase shifter, and a switch. The antenna element provides a signal that passes through a phase shifter to a switch. The signal may be passed to a summing element if the switch is closed, or not passed if the switch is open. The summing element receives signals from the receive channels, and provides a sum signal to the mixer. In phased array mode, the switches are closed and antenna controller adjusts the phase angles of the phase shifters to provide a steerable real receive beam. In DBF mode, the phase shifters are maintained at a predetermined value, and switches are operated sequentially to provide time-multiplexed signals from the antenna elements to the summing element. The apparatus may also include a transmitter, which may in some examples include a phased array transmit antenna array.

BRIEF DESCRIPTION OF THE DRAWINGS

FIG. 4 shows a transmit signal available using examples of the present invention.

FIG. 5 shows the receive radar signal more clearly distinguishing the two objects in the field of view.

DETAILED DESCRIPTION OF THE PREFERRED EMBODIMENTS

Figure 1:
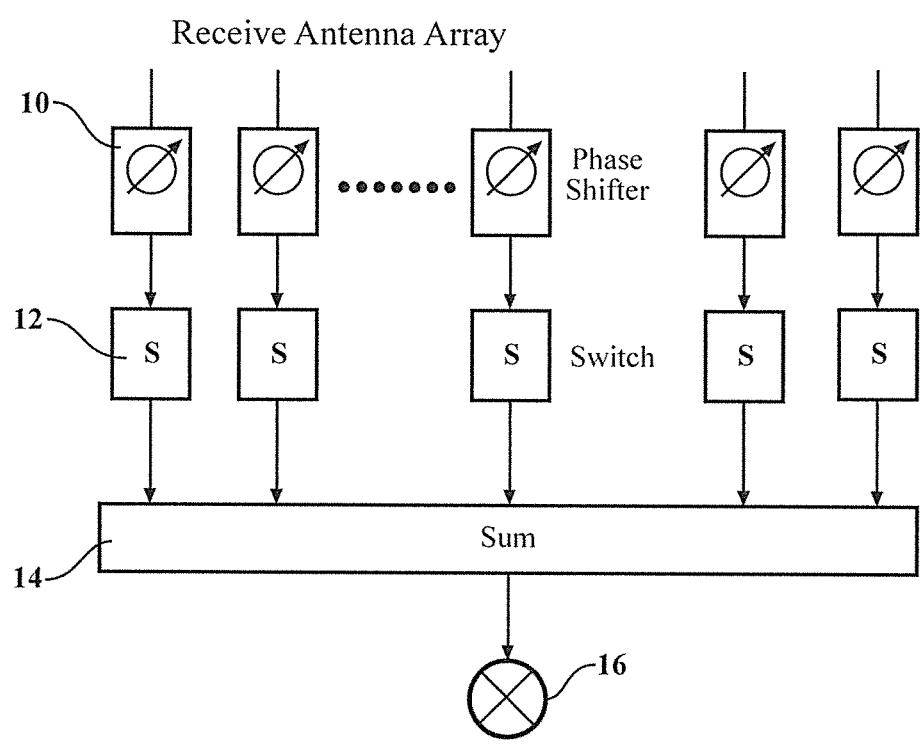
FIG. 1 shows a receive antenna array that can be operated as phased array receiver and also as a DBF receiver.

Examples of the present invention include improved radar apparatus, and methods of operating a radar apparatus. In particular, examples include improved radar for land vehicles, such as automobiles. Example apparatus combine digital beam forming (DBF) and phased array radar within the same hardware configuration. DBF and phased array operation are available to the radar apparatus, for example using a radar controller using an algorithm to control selection and operation of the radar apparatus for improved searching and object tracking strategies.

DBF radars are known in the art, and conventionally allow computation of a virtual beam using a computational algorithm. Super-resolution algorithms, such as MUSIC or ESPRIT can be used to obtain high-resolution radar signals from a wide field of view radar. However, a conventional DBF radar is restricted by the number of receive channels in the radar apparatus. Conventional DBF radars require each channel to have its own mixer. However, mixers occupy a large area of RF IC (radio frequency integrated circuit) real estate, limiting the number of channels that can be included into a conventional radar chip.

Examples of the present invention include a DBF radar using multiplexing (time sharing) of a single mixer for all channels, allowing the number of channels that can be used to be increased. This, therefore, increases the performance and resolution of DBF algorithms, compared to conventional radar apparatus. Examples of the present invention further include a radar apparatus that may be used in a DBF mode and a phased array mode. The operating mode can be selected at any time during the apparatus function, allowing improved tracking, obstruction identification, and noise elimination within the radar apparatus. For example, the phased array mode can be used to adaptively form a real radar beam to exclude sources of interference, which may include other vehicles using ACC (adaptive cruise control) and large structures that do not pose an obstacle to the vehicle, such as structures on the side of the road. Further, phased array mode can be selected to improve the resolution within a narrower portion of the field of view, for example, a segment including a low profile target, such as a human being.

For the first time, an antenna architecture is described that allows both DBF and phased array operation. Further, the use of time-multiplexed DBF allows the number of channels to be increased, and the DBF radar resolution to be enhanced. The use of additional channels in DBF calculations increases resolution and accuracy of angle determination.

In some examples of the present invention, a split architecture is used where one portion of the channels is allocated to the radar transmitter, and the remaining channels are allocated to the radar receiver. For example, half the channels can be allocated to the transmitter, and the other half to the receiver. Ghost targets due to multi-scattering paths returns of the radar signal can be directly identified when the transmitter is operated in phased array mode to form a real beam, and the receiver is operated in DBF mode. In a conventional radar, ghost targets are identified by solving a system of equations, which requires a large matrix inversion, which is highly computationally demanding.

FIG. 1 shows a schematic of the radar architecture, showing a number of receive antenna channels. Each receive antenna channel includes a phase shifter 10 and switch 12, the switch being labeled with a single S. The signals are summed at 14, and passed to a single mixer 16.

In DBF mode, operation of the radar includes switching between channels using the switches 12. All switches are set to an off state, except for the active channel. Each active channel is sampled once, before switching to the next active channel, until all channels have been visited and the switching pattern restarts. Signals are received from each antenna array element, by selective operation of one of the switches, allowing receive signals to be built up for each receive antenna array. Each channel is revisited at a rate quicker than required by the Nyquist theorem for the highest intermediate frequency (IF) output. If there are N antenna array elements, N complex baseband waveforms are acquired for each of the N channels. These waveforms may then be fed to a super-resolution algorithm, such as MUSIC or ESPRIT, which may be executed by a processor within a radar controller.

The architecture of FIG. 1 can also be used for phased array operation. In phased-array mode, all switches are closed (in the on state), and the phase shifters are adjusted using appropriate control signals to provide the necessary complex weights to form a real beam. Beam forming is determined using a phased array radar algorithm, which are known in the art. The architecture allows adaptive techniques to be used in phased array mode, and signal to noise ratio improvements can be achieved by nulling out noise sources, or by preferentially directing the real beam receive from low profile targets.

The example radar apparatus is very useful for automotive radar applications, for example as part of an improved ACC (adaptive cruise control) system.

In some examples, the illustrated architecture resides in a single RF IC (radio frequency integrated circuit). In some examples, the illustrative channels may be simultaneously operated in phased array and DBF mode. For example, both transmit and receive sides of the radar apparatus have multiple phase shifters, allowing the transmit side to be operated in phased array mode, forming a beam and sending RF power in a desired direction, and the receive side may be operated in DBF mode. This may be achieved by dividing the available channels, for example, using a portion of the channels for transmit and the remaining available channels for receive. Alternatively, separate chips may be used for transmit and receive, and each may be operated in a selected mode, as desired.

Examples of the present invention allow the number of receive and/or transmit channels to be increased without using additional mixers. This is achieved by multiplexing one mixer for all transmit and/or receive channels. In DBF mode, the apparatus samples one channel at a time until all channels have been sampled, before looping back and repeating the sweep. The radar transmit waveform may be configured to work well with time-multiplexing DBF operation. The receive data can be used with any conventional super-high resolution technique.

In some operational modes, a noise source or low profile target is identified in DBF operation. Phased array operation is then used to acquire a more detailed signal from the low-resolution target, or to exclude noise sources. For example, the adaptive formation of a real beam using phased array operation can be used to target low profile targets, such as pedestrians.

For the first time, time multiplexed DBF operation and phased array radar operation were combined in a single apparatus, allowing a real beam to be adaptively formed, for example to exclude noise sources or acquire improved resolution response from a low profile target.

Figure 2:
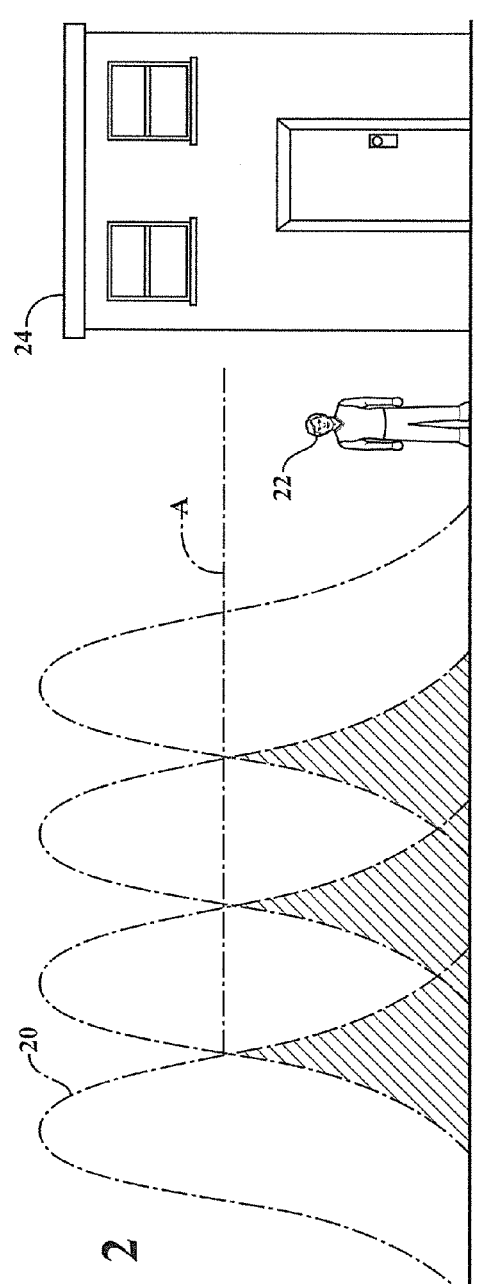
FIG. 2 shows a transmitted waveform incident on a person and a building.

FIG. 2 shows a conventional waveform from a transmit antenna incident on a pedestrian 22 and building 24. Compared with the building, the pedestrian presents a much lower radar cross-section.

Figure 3:
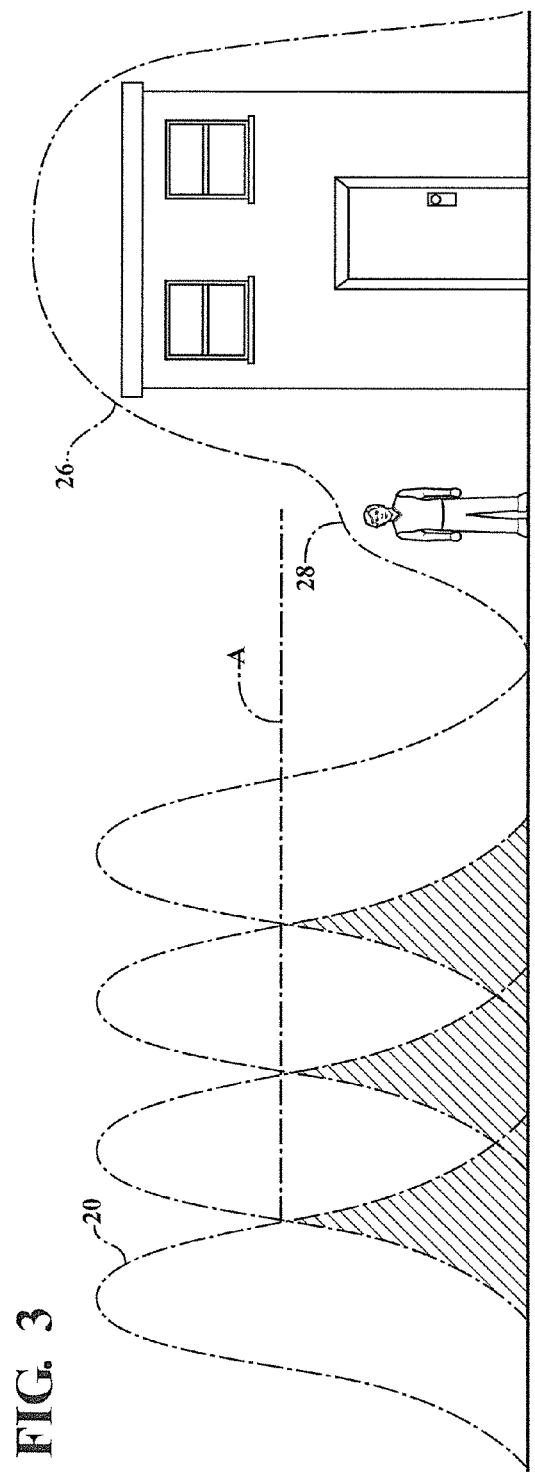
FIG. 3 illustrates the receive waveform, in which the person is hard to discern in the receive signal.

FIG. 3 illustrates the receive radar signal shown at 26 and 28. Using the conventional waveform, the signal for the pedestrian is almost lost compared with a much higher signal from the structure.

FIG. 4 shows the transmit signal from a radar according to examples of the present invention, incident on the same structure and pedestrian as shown in FIGS. 1 and 2.

FIG. 5 shows the receive signal 32 and 34, showing much improved resolution of the pedestrian signal 34 from the structure signal 32.

The overlapping portions of the transmit signal define a noise baseline level illustrated as line A in FIGS. 2-3 and line B in FIGS. 4-5. This noise baseline almost swamps the pedestrian reflected signal as shown at 28 in FIG. 3, whereas it lies below the response of the pedestrian shown in FIG. 5. This noise reduction helps improve the resolution of the radar, and allows improved detection of low profile targets, such as pedestrians.

Figure 6:
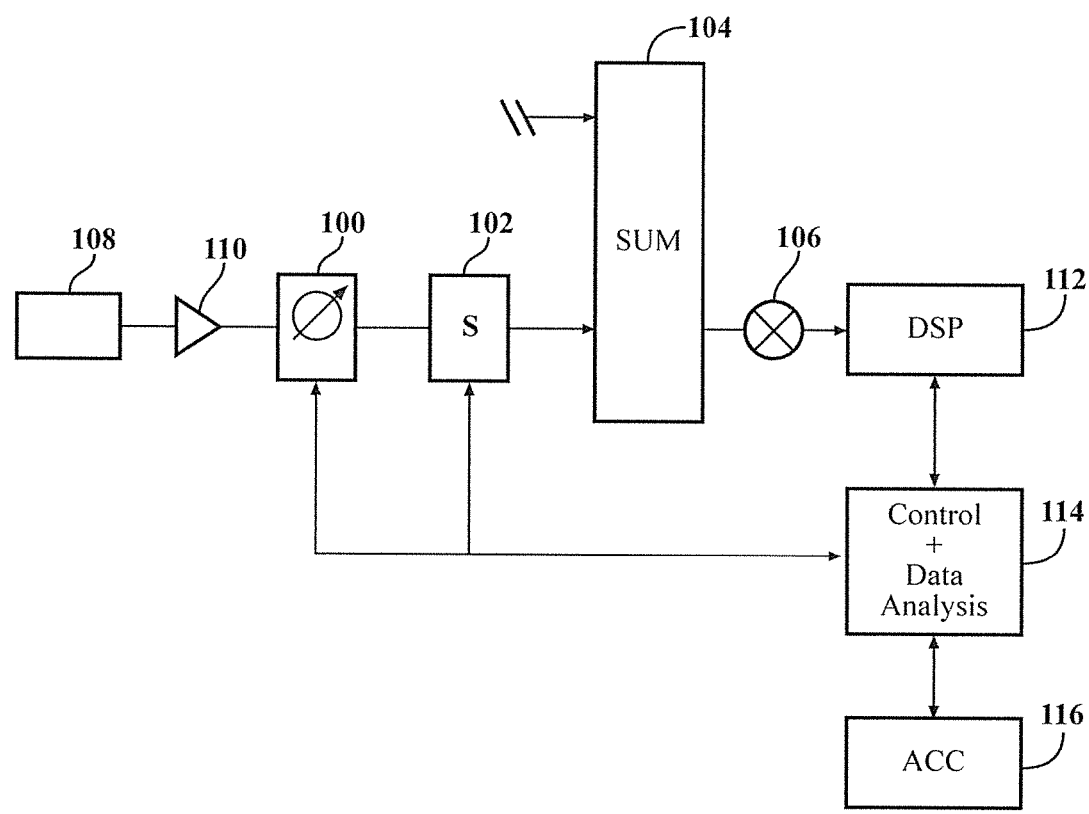
FIG. 6 is a simplified schematic illustrating implementation of the receive antenna array.

FIG. 6 is a simplified schematic, showing phase shifter 100, switch 102, and summing element 104, corresponding to elements 10, 12, and 14 in FIG. 1. The output of the summing element is sent to mixer 106, which is then provides a mixer signal to the digital signal processing (DSP) element 112. The output from the DSP element 112 is fed to a control circuit and data analyzer, labeled 114. A radar controller may include the DSP element and the control circuit and data analyzer. The data output can be used to control ACC (adaptive cruise control 116). Amplifiers such as 110 are shown in each channel, and amplifiers may alternatively or additionally be used elsewhere within the circuit, for example at the output of summing element 104. The control circuit is used to control the setting of the switch (S) 102 and phase shifter 100, for each channel of the radar. This particular simplified schematic only shows a single receive channel. In examples of the present invention, the transmit antenna may be a separate element with dedicated channel(s), or may be formed using channels split off from those otherwise available for the receive channels.

Examples of the present invention allow an increase in the channel number for DBF operation, without physically adding channels. A time-multiplexed DBF receive circuit may use only one mixer, freeing up space that can be used for more channels. Further, some examples of the present invention allow a combination of time multiplexed operation in a DBF operating mode, and phase shifting operation in a phased array mode.

Channels may be dynamically reallocated between DBF and phased array modes, allowing simultaneous operation of both operating modes. In some examples, channels may be dynamically reallocated between transmit and receive operation.

In some examples, complex weights are only provided to the phase shifters at the receive portion of the radar apparatus. This allows noise reduction, and improves detection of low profile targets, such as pedestrians, or in some cases, vehicles smaller than a nearby larger vehicle or structure.

The transmit waveform can be adapted to work well with the time multiplexed DBF radar operation. For example, the transmit waveform may be synchronized with the switch closing sequence in DBF operating mode, taking account of the time-of-flight required for detecting radar signals reflected from a target.

Examples of the present invention provide improved operation, improved detection of low profile targets, and in some cases have appreciable power savings over comparable conventional apparatus. The number of channels may be limited by chip size, for a single chip implementation. However, as described in the examples above, generally more phase shifters may be included in the apparatus than mixers, as conventionally the mixer occupies more chip space. Hence, by multiplexing the operation of a single mixer, an increased number of phase shifters can be used, allowing the number of channels to be increased beyond that of a conventional radar chip.

In some examples of the present invention, DBF and phased array radar operation is used at the same time, one for the transmit beam and the other for the receive beam. The real beam of the phased array can be steered to avoid noise targets, or focus radar energy on low profile targets. Noise sources may be identified in earlier radar scans, and subsequent steering of real transmit and/or receive beams adaptively modified to avoid noise sources.

However, in some examples, the splitting of a single chip into transmit and receive portions is not used, and a single chip can be used entirely receive radar applications.

In some examples, the DBF radar may be used to identify targets within a wide field of view, and the phased array radar mode then selected to obtain higher resolution signals from a segment of the field of view in which targets are identified, using real transmit and/or receive beams steered by appropriate adjustment of phase shifters.

In some examples, a time of flight parameter may be used to divide chip operation into transmit and receive. For example, all channels may be used for transmit, for example in phased array mode. After a time period corresponding to the expected time of flight for receiving a receive signal, the chip may be operated in receive mode. Either transmit or receive mode may be operated in either wide field of view or phased array operation.

By reducing the number of mixers, in some examples down to a single mixer, the power requirements of the radar chip may be reduced. The mixers generally are larger on the chip and have higher power requirements than the phase shifters.

Examples of the present invention include a radar apparatus that has both functionalities of a DBF and a phased array radar. The DBF and phased array modes can be operated simultaneously (for example, by splitting the available channels between transmit and receive), or time sequentially (for example, based on the expected time delay between transmit and receive). DBF and phased array operation are synergistically used together to eliminate the shortcomings of both. For example, DBF is useful in identifying new targets, as a wide field of view can be examined rapidly. Phased array operation is then useful for obtaining higher resolution or otherwise improved signals from identified targets, for example to identify the exact type of targets.

In some examples of the present invention, each DBF channel includes a single phase shifter. Phase shifters may be set to similar values, such as a set value, such as zero phase shift, during DBF operation, and then weighted using complex algorithms for phased array operation with the switch array in the closed state.

The invention is not restricted to the illustrative examples described above. Examples described are not intended to limit the scope of the invention. Changes therein, other combinations of elements, and other applications will occur to those skilled in the art.

Having described our invention, We claim:

1. A radar system comprising:
a transmitter;
a receiver, including a plurality of receive channels, each receive channel including a receive antenna element, a phase shifter, and a switch configured to turn the receive channel on and off;
a summing element receiving signals from the receive channels;
a mixer receiving a sum signal from the summing element; and
an antenna controller adjusting phase angles of phase shifters in the receive channels, and configured to actuate the switch so as to turn on and off a respective receive channel,
wherein the antenna controller is further configured to operate the radar system in a phased array mode and digital beam forming mode, wherein in the phased array mode the antenna controller closes all switches at the same time and the phase shifters receive shift weightings, and wherein in the digital beam forming mode, the antenna controller sets all the phase shifters to a reference value, and the antenna controller sequentially turns each of the plurality of switches on and off so as to have only one of the plurality of receive channels on at any given time, wherein time-multiplexed signals from each receive channel turned on is collected by the summing element and processed so as to generate a digital beam after a predetermined number of receive channels is turned on and off.

2. The radar system of claim 1, the radar system controller including a digital beam former operable to determine a virtual beam from the mixer signal when the radar system is in the digital beam forming mode.

3. The radar system of claim 2, the digital beam former being provided by a digital beam forming algorithm executed by a processor in the radar controller.

4. The radar system of claim 3, the digital beam forming algorithm being selected from a group of algorithms consisting of a MUSIC (multiple signal classification) algorithm and an ESPRIT (estimation of signal parameters via rotational invariant technique) algorithm.

5. The radar system of claim 1, the electronic control circuit further including the phased array antenna controller and being operable to steer the receive beam.

6. The radar system of claim 1, the antenna controller being operable to steer a real phased array receive beam when the radar system is in the phased array mode.

7. The radar system of claim 1, the radar system being an automotive radar system.

8. A radar system, comprising:
a receiver, including a plurality of receive channels, each receive channel including a receive antenna element, a phase shifter, and a switch configured to turn the respective receive channel on and off, the antenna element providing an antenna signal that passes through the phase shifter to the switch, the receive channel providing a receiver signal to a summing element only when the switch is closed, wherein the summing element receives receiver signals from the receive channels and provides a sum signal,
a mixer receiving the sum signal from the summing element;
an antenna controller configured to adjust phase angles of the phase shifters and to actuate the switch so as to turn a respective receive channel on and off, the antenna controller further configured to operate the apparatus in a phased array mode and digital beam forming mode, wherein in the phased array mode the antenna controller closes all switches at the same time and the phase shifters receive shift weightings, and wherein in the digital beam forming mode, the antenna controller sets all the phase shifters to a reference value, and the antenna controller sequentially turns each of the plurality of switches on and off so as to have only one of the plurality of receive channels on at any given time, wherein time-multiplexed signals from each receive channel turned on is collected by the summing element and processed so as to generate a digital beam after a predetermined number of receive channels is turned on and off; and a digital beam former configured to determine a virtual beam from the mixer signal when the radar system is in the digital beam forming mode.

* * * * *